United States Patent [19]

Sidebotham et al.

[11] 4,118,187

[45] * Oct. 3, 1978

[54] FABRIC DYE STRIPPING, SEPARATION AND RECOVERY OF POLYESTER

[75] Inventors: Norman C. Sidebotham, Gulf Breeze; Paul D. Shoemaker; Clarence W. Young, III, both of Pensacola, all of Fla.

[73] Assignee: Monsanto Company, St. Louis, Mo.

[ * ] Notice: The portion of the term of this patent subsequent to Jan. 18, 1994, has been disclaimed.

[21] Appl. No.: 749,149

[22] Filed: Dec. 9, 1976

Related U.S. Application Data

[63] Continuation-in-part of Ser. No. 578,592, May 19, 1975, Pat. No. 4,003,880.

[51] Int. Cl.$^2$ .................. D06L 3/14; C08G 63/76; C08J 3/08
[52] U.S. Cl. ......................... 8/102; 260/2.3; 264/37; 528/493; 528/486; 528/487; 528/491; 528/492; 528/494; 528/495; 528/497
[58] Field of Search .................. 8/102; 260/75 T, 2.3; 264/37

[56] References Cited

U.S. PATENT DOCUMENTS

| | | | |
|---|---|---|---|
| 2,337,928 | 12/1943 | Reichel | 264/37 |
| 2,938,811 | 5/1960 | Hermes | 260/75 T |
| 3,132,194 | 5/1964 | Edmonds et al. | 264/37 |
| 3,159,964 | 12/1964 | Kretsch | 260/75 T |
| 3,716,614 | 2/1973 | Okamoto et al. | 264/344 |
| 3,758,457 | 9/1973 | Broeck et al. | 264/37 |
| 3,943,105 | 3/1976 | Hermes | 260/75 T |
| 4,003,880 | 1/1977 | Sidebotham et al. | 264/37 |

OTHER PUBLICATIONS

Ault, A. *Technique & Expts. for Organic Chem.* Holbrook Press, Inc. Boston, 1973, 1976.

*Primary Examiner*—Joseph L. Schofer
*Assistant Examiner*—Maria S. Tungol
*Attorney, Agent, or Firm*—Robert L. Broad, Jr.

[57] ABSTRACT

Polyester polymer is recovered from mixed collections of fibers in the form of fibers, filaments, yarns, or fabrics (including dyed or undyed fibers other than polyester fibers as well as dyed polyester fibers) and used in the production of new undyed fibers, by solvent stripping the dye from the polyester fibers without dissolving the fibers, and with additional solvent, selectively dissolving the polyester fibers in successive but functionally integrated steps; separating the dissolved fibers from an undissolved impurities and thereafter separating the residual dye-stripping solvent and the additional solvent from the polyester component without precipitating the polyester component from solution by evaporating the solvent, preferably by atmospheric boiling and vacuum finishing of the molten solution.

22 Claims, No Drawings

FABRIC DYE STRIPPING, SEPARATION AND RECOVERY OF POLYESTER

This application is a continuation-in-part of application, Ser. No. 578,592, filed on May 19, 1975 in the names of Norman C. Sidebotham, Paul D. Shoemaker and Clarence W. Young, III, for "Fabric Dye Stripping, Separation and Recovery of Polyester", now U.S. Pat. No. 4,003,880.

BACKGROUND OF THE INVENTION

1. Field of the Invention

The invention relates to a process for selectively recovering thermoplastic polymers, and particularly polyester polymers from collections of yarns, films, fibers or fabrics, including dyed polyester fibers, for use in production of new undyed thermoplastic products, particularly polyester fibers, films and the like. More specifically, the invention relates to a process for selectively recovering polyester polymer by means of stripping the dye from dyed polyester fibers, subsequently dissolving the polyester fibers, separating the solution from any insoluble materials, and thereafter recovering the polymer, without precipitation thereof, by evaporation of the solvent from the molten polymer.

2. Prior Art

The consumption of thermoplastic polymers is greater than ten billion pounds per year. Some, such as polyethylene, polypropylene, polyvinylchloride, polystyrene, polyamides and polyester, surpass the billion pounds per year rate. The use of many of these relatively expensive thermoplastic polymers for synthetic fibers has, notwithstanding significant periods of decline, increased tremendously.

Concomitantly the world is facing a shortage of raw materials for thermoplastic polymers; and sophisticated and efficient methods of recycling are needed.

Various methods have been described in the prior art for separation and/or recovery of thermoplastic polymer, including polyester polymers, from scrap polymers; and these have included the dissolution of the polymer in various solvents; thereafter precipitating and recovering the polymer. The objects of such processes were to avoid polymer degradation and/or to separate from the usable polymer the degraded polymer and/or monomers as impurities. The processes were slow and expensive; suitable only for laboratory usage; and they neither addressed themselves to nor did they solve fiber separation and dye removal problems.

Our copending U.S. patent application Ser. No. 578,592 filed May 19, 1975, now U.S. Pat. No. 4,003,850, discloses a process for recoverying polyester from waste fabrics or fibers by dye stripping, selectively dissolving the polyester fibers, removing the undissolved fibers and any other undissolved impurities from the solution; and thereafter precipitating polyester out of, and separating the polyester from the solution.

Whether by prior art processes or by the copending process described, the precipitation of polyester out of solution inevitability brings forth with the precipitated polyester polymer substantial quantities of the solvent and dye which must be separated from the newly precipitated polymer by way of decantation and/or filtration (for gross separation) as well as evaporation or solvent leaching or washing (for trace removal). Since the precipitation step does not eliminate the necessity for evaporation or equivalent treatment, and complicates rather than simplifies dye removal, it will be seen that elimination of the precipitation step in an efficient method of separating the polyester polymer from the solvent would be a meritorious advance in the art, and constitutes a primary object of this invention.

It is another advantage of this invention that the same solvent or solvent system may be used for both dye-stripping and polymer recovery, as well as for fiber separation.

It is also an advantage of this invention that removal of solvent from recovered polyester is greatly simplified and that solvent removal may be conveniently combined with a polymerization step wherever needed to increase molecular weight.

SUMMARY OF THE INVENTION

In accordance with the present invention, a process is provided whereby dye-stripping, separation and polymer recovery are combined in such a manner that the dye-stripping phase actually constitutes the first step of the dissolution and separation phase in that after completion of the so-called "dye-stripping" phase the fibers remain saturated with a dye-stripping solvent which serves as part of the solvent used for dissolution of the polyester, so that only one solvent system may be employed.

Briefly, the inventive concept is a process for selectively recovering polyester polymer from collections of dyed fibers or fabrics including dyed polyester fibers, comprising:

(1) contacting collections of yarns, films, fibers, or fabrics, including dyed polyester fibers with a dye-stripping solvent for polyester polymer which is preferably not a solvent for the remaining constituents at a temperature below which the polyester fibers dissolve and above which the crystalline lattice of the polyester fibers swell to as to release the dye, thereby stripping the dye from the polyester fibers;

(2) removing the excess of the dye-containing dye-stripping solvent which is not absorbed by the fibers and fabrics;

(3) contacting the fibers (which may contain residual dye-stripping solvent) with sufficient addition of a primary dissolution solvent under selective dissolution conditions for polyester fibers;

(4) removing the undissolved fibers or other solid impurities from the solution; and (5) separating the solvent or solvents from the polyester by evaporaing the solvent from dissolved and/or molten polyester without precipitating the polyester from solution.

DESCRIPTION OF THE PREFERRED EMBODIMENTS

For the purposes of this description, solvents will be classified as "dye-stripping solvents" and "primary dissolution solvents". A "dye-stripping solvent", as used herein, is any solvent which swells the crystalline structure of the polyester fiber, at the same time dissolving and thereby removing conventional dyes and finishes. It is selective in nature in the sense that it will dissolve a minimum, if any, of polyester and preferably will neither dissolve nor swell other components in the starting collection of materials. A "primary dissolution solvent" is a solvent whose primary function in the course of this invention is to dissolve the polyester. It should have the characteristic of dissolving a significant amount of polyester, selectively with respect to other components in the starting material, at moderate temperatures, all the while permitting subsequent removal from the polyester by vaporization. All presently known "primary dissolution solvents" are also "dye-stripping" solvents (when employed at lower temperatures and/or lower concentrations), but the converse is not necessarily true. Of course it is preferred, according to this invention, that the dye-stripping solvent and the primary dissolution solvent be the same, and such identity is one aspect of this invention. If identical solvents are not used, it is desirable that they be compatible in the sense that they do not functionally interfere with one another and that they be readily separable or functionally interchangeable, as this will permit a much more simplified recovery system.

It is also preferred that solvents employed in this invention for dye-stripping and as a primary dissolution solvent because the solubility of polyester in naphthalene is a strong function of temperature, ranging from 0 solubility at 170° C. to about 55 percent polyester solubility at 218° C. (boiling point of naphthalene). Naphthalene is also highly selective in the sense that although minor amounts of nylon 66 (<0.1%) may dissolve, it will not, at up to 218° C., dissolve most other common fibers including acetate, cotton, rayon, wool, silk, flax, nylon-6, acrylic, glass and metallic fibers, nor will it dissolve paper, glass or metal scraps.

Polyester solvents and solvent systems other than naphthalene which are known to be and have been demonstrated as suitable for dye-stripping and selective dissolution of polyester, are listed in the following table showing acceptable dissolution conditions only.

TABLE I

|   | | Approx. Ratios (where applicable) | | Selective of polyester as against all common fibers* except |
|---|---|---|---|---|
| 1. | Meta-cresol | (25° C.) | 100 | Acetate, nylon 6, nylon 66 |
| 2. | Benzophenone | (210° C.) | 100 | Acetate, polypropylene |
| 3. | 1,1,1,3,3,3-Hexafluoro-isopropanol | (25° C.) | 100 | Acetate, acrylic, nylon 6, nylon 66 |
| 4. | Diphenylmethane | (210° C.) | 100 | Acetate (<1/3%), acrylic (~1/2%) |
| 5. | Biphenyl | (210° C.) | 100 | [Note: polypropylene melts but floats in separate phase] None |
| 6. | Acenaphthene | (210° C.) | 100 | [Note: polypropylene melts but floats in separate phase] None |
| 7. | Phenanthrene | (210° C.) | 100 | [Note: polypropylene melts but floats in separate phase] Polypropylene |

"Common fibers" are: acetate, acrylic, cotton, wool, nylon 6, nylon 66, polypropylene, and rayon.

invention do not significantly degrade or depolymerize the polyester under conditions required for removal by evaporation. In addition, the solvents should have the characteristic of being essentially non-solvents for the other components in a collection of yarns, films, fibers, fabrics, etc., if such a collection is employed as the starting material. Of course, whenever solvents are used together they should be compatible in the sense that they do not explode or react violently.

Suitable dye-stripping and primary dissolution solvents include most of the so-called "polyester dye carriers" which can be easily removed from the fibers under vacuum at a temperature at which no degradation occurs. It is well known, for example, that most solutions of the following compounds will cause an increase in the diameter of the polyester fiber immersed therein: phenol, metacresol, tetrahydronaphthalene, orthophenylphenol, paraphenylphenol, and such compounds may be employed as either dye-stripping solvents or primary dissolution solvents or both. Other known solvents and solvent systems for polyester which may be employed for both dye removal and dissolution include para-chloroanisole, nitrobenzene, acetophenone, propylene carbonate, dimethyl sulfoxide, 2,6 xylenol, quinoline, trifluoroacetic acid, ortho-chlorophenol and trichlorophenol. Preferred are polyester solvents and solvent systems which include compounds having at least one or more and more commonly two or more aromatic rings in their structure such as diphenyl, diphenyl ether, naphthalene, methylnaphthalene, benzophenone, diphenylmethane, paradichlorobenzene, acenaphthene, phenanthrene and similar compounds. Naphthalene has been found especially suitable for the practice of this The preliminary dye removal may be accomplished by any method of immersing, or otherwise intimately contacting and agitating the fiber or fabric collection with the dye-stripping solvent, in any manner which removes all or most of the dye concentration in the fiber or fabric collection. Any one of the following methods may be used to accomplish the preliminary dye removal. Although the starting material is described as "fabric" or "fabric collection", it should be understood to include "fibers" as hereinafter defined.

1. Contacting a batch of fabric with a large amount of dye-stripping solvent, which quantity is large enough to dilute the dye concentration in the fabric to the desired level.

2. Contacting a batch of fabric with dye-stripping solvent which the dye-containing solvent is agitated if desired and continuously removed and replaced with fresh or relatively dye-free dye-stripping solvent, in sufficient quantity to reduce the fabric's dye concentration to the desired level.

3. Contacting a batch of fabric with fresh or relatively dye-free dye-stripping solvent, using agitation if desired, for a given batch contact time; thereafter removing substantially all of the dye-containing solvent and contacting the fabric with fresh or relatively dye-free dye-stripping solvent, with agitation if desired; for some period of contact time which may differ from the original or subsequent batch contact times; thereafter repeating as many times as desired such dye-stripping solvent addition, fabric contacting, and solvent removal, in order to obtain the desired degree of dye removal from the fabric. (This method is substantially equivalent to the laboratory Soxhlet extractor.)

4. Fabric or a fabric collection is continuously moved along a path or conduit in one direction while simultaneously being contacted with a dye-stripping solvent, which solvent is more or less continuously flowing in a direction opposite to the movement of the fabric. Fresh or relatively dye-free dye-stripping solvent is added in a manner which maintains a relatively continuous flow of the dye-stripping solvent, and the dye-containing dye-stripping solvent is more or less continuously removed at or near the place where the fabric or fabric collection is first contacted with the dye-stripping solvent.

5. Fabric or a fabric collection is successively contacted with dye-stripping solvent in a multiplicity of dye-stripping solvent contact stages, with said contact stages arranged in such a manner that each subsequent contact stage reduces the dye concentration in the fabric collection; especially a counter-current flow arrangement of contact stages, in which fresh or relatively dye-free dye-stripping solvent is added only to the final fabric contact stage, with a more or less equal amount of dye-containing dye-stripping solvent removed from the final stage and added to the dye-stripping solvent in the next-to-final contact stage, such counter-current flow replenishment continues for as many contact stages as are used, with the dye-laden dye-stripping solvent removed from the first fabric contact stage.

Of course, in these dye-stripping solvent contacting processes, the fabric or fabric collection may be added to the dye-stripping solvent, or the dye-stripping solvent may be added to the fabric or fabric collection. Similarly, of course, the fabric may be moved through dye-stripping solvent which is kept more or less in one place; or the fabric may be held more or less at one place while the dye-stripping solvent is moved into contact with and subsequently removed from the fabric or fabric collection; or, both the fabric and dye-stripping solvent may be moved simultaneously or alternately.

For efficient dye-stripping without polymer loss, the temperature of the dye-stripping solvent during the dye-stripping phase must be below the temperature at which there is significant dissolution of the polyester fibers. However, it is well known among textile dyeing and finishing experts that most efficient dye-stripping of polyester fibers will occur at the highest temperature practical because of swelling of the crystalline lattice of the polyester is greatest at the higher temperatures. A significantly lower temperature will decrease swelling of the fiber, and at just above the freezing or solidification point of the solvent, there will be little or no dye-stripping. Preferred, therefore, is the highest temperature below which there is significant dissolution of the polyester.

Apparatus or equipment which may be used for the preliminary dye removal operation include tanks or vats, which may be agitated or not agitated, whether open top or covered or sealed to hold pressure or vacuum; bowl-type washing machines; pressure dyeing apparatus; centrifugal filters, with or without provisions for solvent rinsing or continuous or intermittent removal of fabric; continuously or intermittently moving conveyor belts passing through solvent-contacting zones; screw conveyor devices; and solvent spraying devices.

When the preliminary dye-stripping step is completed, and the dye-containing dye-stripping solvent is removed, the remaining wet fabric or collection of fabrics containing residual dye and solvent is contacted with sufficient additional relatively dye-free primary solvent under dissolution conditions for the polyester fibers. Of course, the residual dye-containing solvent-laden fabric may be added to the primary solvent, or the primary solvent may be added to the fabric. As previously mentioned, the additional primary dissolution solvent may or may not be the same solvent or solvent system as employed for dye-stripping; but it is preferable to use the same solvent or solvent system for process efficiency, simplicity, and economy. A recycling system is much preferred over a non-recycling system; and it might well be essential to the commercial feasibility of the process. Incompatible solvents or solvent systems would add to the complexity and cost of any such recycling.

When the polyester fibers have dissolved, any undissolved fabrics are removed from solution for discard or for subsequent use. The removal may be accomplished by any known physical separation procedures such as screening, centrifuging, decanting, filtration or any combination of these procedures.

We have found that polyester can be then recovered from a molten polyester solution by heating the solution above the boiling point of the solvent (or solvents), removing solvent vapors (for subsequent condensation and reuse), possibly displacing the solvent vapors with another gas such as an inert gas sweep. The removal of solvent by atmospheric boiling is usually slow and may require temperatures so far above the melting point of the polyester that polymer degradation can occur. Atmospheric boiling may also result in a high level of residual solvent with the polymer. In a solution composed of 70% naphthalene and 30% polyester, for example, atmospheric boiling at 260° failed to remove at least about 12% of the naphthalene. It has been found that a much more efficient procedure in the recovery of polyester from most dissolution solvents (and most particularly from the preferred class of solvents having at least one and more commonly two or more of the aromatic rings in their structure) is to boil vigorously at atmospheric pressure for a short time using a heat transfer medium slightly above the melting point of the polyester, and then sustain this vigorous boiling by applying a vacuum to the molten solution.

Of course temperature and pressure interact during the vacuum solvent boil-off. If the vacuum is applied too rapidly, very rapid vaporization of solvent cools the molten polyester solution enough to actually freeze it. If the polyester solution freezes (even only partially), the vaporization process is slowed considerably, and the recovered polyester will contain much more residual solvent. The higher the temperature of the molten polyester solution, the faster the vacuum can be applied for rapid solvent removal without freezing. As mentioned before, however, the higher temperature can promote polyester degradation; and therefore a balance must be maintained between the solution temperature and the rate of vacuum application.

Polyesters and copolyesters known to be useful in the practice of this invention are those derived from aromatic dicarboxylic acids such as terephthalic acid and isophthalic acid and glycols such as ethylene and butylene glycol. Representative examples include poly(ethylene terephthalate), poly(trimethylene terephthalate), poly(tetramethylene terephthalate), poly(ethylene isophthalate), poly(octamethylene terephthalate), poly(decamethylene terephthalate), poly(pentamethylene isophthalate), poly(tetramethylene isophthalate), poly(hexamethylene isophthalate), poly(1,4-cyclohexylene terephthalate), and poly(ethylene-co-tetramethylene terephthalate).

Unless otherwise indicated, the terms "collections of fibers" and "polyester fibers", as used herein to describe the starting material which is subjected to dye-stripping, separation and recovery in accordance with this invention, includes fibers, filaments, monofilaments, bands, ribbons, tubes, films and other constructions of linear polyester and includes yarns, threads, fabrics and other products into which these constructions may be incorporated, as well as common impurities associated with such products, new or old.

EXAMPLES

The feedstock was first prewashed in naphthalene at 165° C. (whenever dye was present in the starting material). Polyester feedstock was then dissolved in naphthalene at about 30% polyester and at a solutioning temperature of about 210° C. The solution was then filtered to remove insoluble contaminates such as nylon, acrylics, paper, cotton, wool, silk, rayon, acetate and metals. The polyester/naththalene solution was then boiled in an oil-heated 3-neck boiling flask, fitted with a thermometer, an inert gas purge nozzle, and a short air-cooled condenser connected to a 2-neck flask, which functions as a naphthalene collector. A small purge of inert gas was used to sweep naphthalene vapors into the condenser. Boiling was accomplished in an oil bath maintained at a temperature of 260° C.-270° C. When the rate of boiling declined, the vacuum was slowly applied to the apparatus through the second neck of the naphthalene collector. A vacuum regulator was used to control the vacuum pull-down rate on the boiling solution to minimize foaming, splashing, and possible freezing of the solution. When solvent removal was completed, the vacuum was replaced with dry nitrogen and the flask was removed from the hot oil. The inert blanket was maintained as the polyester cooled and froze. The flask was wrapped in cloth because expansion of the solidifying polyester breaks the flask. After cooling was complete, the polyester product was recovered from the broken flask for analysis and subsequent spinning to fiber.

Using a controlled polyester flake stock having an intrinsic viscosity of 0.6413, the following recovery processes were employed as above using the finishing vacuum as indicated.

TABLE II

| Examples | Finishing Vacuum (mm Hg) | Residual Naphthalene (Wt. %) | Intrinsic Viscosity of Product |
|---|---|---|---|
| 1 | 760 | 11.83 | 0.6631 |
| 2 | 500 | 8.88 | 0.5915 |
| 3 | 300 | 3.15 | 0.6398 |
| 4 | 150 | 1.00 | 0.6651 |
| 5 | 80 | 0.12 | 0.6726 |
| 6 | 42 | Neg. | 0.7004 |
| 7 | 42 | 0.06 | 0.6610 |
| 8 | 24 | Neg. | 0.9975 |
| 9 | 23 | Neg. | 0.7707 |

As can be seen from Table II, there was no significant drop in the intrinsic viscosity of the product, and in some cases it appeared that the viscosity was increased. Any such increase is believed to have been caused by further polymerization occurring during the vacuum removal phase.

Mixed polyester waste fabric was subjected to the same procedure, with the result that although the initial intrinsic viscosity could not be ascertained, recovered polymer of comparable fiber viscosity was obtained which appeared to be reasonable pure based on color observation. These recovered polymer samples were of a quality which could be subjected to melt spinning into synthetic fibers. The spinning procedure was to place chunks of recovered polyester in a laboratory autoclave; pressurize several times with dry nitrogen; place a vacuum (20–40mm Hg) on the autoclave; heat the autoclave until the polyester melts; bleed off the vacuum with dry nitrogen; remove the agitator shaft and affix a spinneret pack; apply dry nitrogen pressure to form filaments from the spinneret; and take up bobbins of the fiber on a Leesona Type 955 winder. Spun bobbins were subsequently drawn over a hot pin at 105° C. at several known draw ratios and physical properties of the drawn fiber were measured. Only crude indications of spinnability and drawability were obtained due in large part to the lack of denier control. The intrinsic viscosity of the recovered prewashed polyester mixed rag feedstock was 0.6867. The spun yarn (10 filaments with conventional fiber finish) was successfully drawn over a hot pin at 105° C., with drawn fiber properties as indicated in Table III.

TABLE III

| Draw Ratio | Drawn Denier | Tenacity (g/d) | Elongation (%) |
|---|---|---|---|
| 4.78 | 85.5 | 3.88 | 15.37 |
| 5.00 | 83.0 | 4.33 | 10.62 |
| 5.50 | 77.5 | 3.43 | 7.23 |

Having thus described our invention and several embodiments thereof, what we desire to claim and secure by letters patent is:

1. A process for separation, recovery and reuse in production, of polyester polymer from a collection of materials comprising a first polyester component comprising dyed polyester fibers and a second component comprising materials other than polyester fibers, said process comprising:

(1) stripping the dye from said dyed polyester fibers by contacting the collection with a dye-stripping solvent at a temperature below which the polyester dissolves and above which the crystalline lattice of the polyester fiber swells so as to release the dye;

(2) removing the excess of the dye-containing dye-stripping solvent which is not absorbed by the collection;

(3) contacting the residual dye-containing dye-stripping solvent-laden fibers with sufficient addition of a primary dissolution solvent which is not a solvent for the second component to dissolve the polyester component under selective dissolution conditions for the polyester component;

(4) separating the dissolved polyester component from the undissolved second component; and (5) separating the residual dye-stripping solvent and the primary dissolution solvent from the polyester component by evaporation of the solvent without precipitating the polyester component from solution.

2. The process of claim 1 wherein the dye-stripping solvent is compatible with the primary dissolution solvent.

3. The process of claim 1 wherein the dye-stripping solvent is the same as the primary dissolution solvent.

4. The process of claim 1 wherein the primary dissolution solvent is selected from the group consisting of: para-chloroanisole, nitrobenzene, acetophenone, propylene carbonate, dimethyl sulfoxide, 2,6 xylenol, quinoline, naphthalene, meta-cresol, phenol, tetrahydronaphthalene, ortho-phenylphenol, para-phenylphenol, trifluoroacetic acid, ortho-chlorophenol, trichlorophenol, diphenyl, diphenyl ether, methyl naphthalene, benzophenone, diphenyl methane, para-dichlorobenzene, acenaphthene and phenanthrene.

5. The process of claim 1 wherein the primary dissolution solvent is naphthalene.

6. The process of claim 1 wherein the primary dissolution solvent is naphthalene and the second component comprises fibers selected from the group consisting of cotton, rayon, silk, nylon-6, nylon-66, acrylic, acetate, wool, flax, glass and metallic fibers.

7. The process of claim 1 wherein evaporation is achieved by boiling at atmospheric pressure and then by applying a vacuum to complete removal of the solvents.

8. The process of claim 1 wherein dye-stripping solvent and the primary dissolution solvent is naphthalene, and the vacuum removal of solvent is conducted at a pressure below 150mm Hg.

9. The process of claim 1 wherein the second component comprises cotton fibers.

10. The process of claim 1 wherein the second component comprises polyamide fibers.

11. The process of claim 1 wherein the second component comprises wool fibers.

12. The process of claim 1 wherein the second component comprises acrylic fibers.

13. The process of claim 1 wherein the second component comprises a member of the group consisting of rayon fibers, acetate fibers and polypropylene fibers.

14. The process of claim 1 wherein the second component comprises a member of the group consisting of paper, metal scraps and glass.

15. The process of claim 1 wherein the primary dissolution solvent is benzophenone, and the second component comprises fibers selected from the group consisting of acrylic, cotton, wool, nylon 6, nylon 66 and rayon.

16. The process of claim 1 wherein the primary dissolution solvent is 1,1,1,3,3,3-hexafluoro-isopropanol and the second component comprises fibers selected from the group consisting of cotton, wool, polypropylene and rayon.

17. The process of claim 1 wherein the primary dissolution solvent is biphenyl, and the second component comprises fibers selected from the group consisting of acetate, acrylic, cotton, wool, nylon 6, nylon 66, and rayon.

18. The process of claim 1 wherein the primary dissolution solvent is acenaphthene and the second component comprises fibers selected from the group consisting of acetate, acrylic, cotton, wool, nylon 6, nylon 66, and rayon.

19. The process of claim 1 wherein the primary dissolution solvent is phenanthrene and the second component comprises fibers selected from the group consisting of acetate, acrylic, cotton, wool, nylon 6, nylon 66 and rayon.

20. The process of claim 1 wherein the primary dissolution solvent is diphenylmethane and the second component comprises fibers selected from the group consisting of cotton, nylon 6, nylon 66, rayon, wool, acetate and acrylic.

21. The process of claim 1 wherein the primary dissolution solvent is meta-cresol and the second component comprises fibers selected from the group consisting of acrylic, cotton, wool, polypropylene and rayon.

22. The process of claim 1 wherein the polyester polymer comprises polyethylene terephthalate.

* * * * *